United States Patent [19]

Dick

[11] 4,073,204
[45] Feb. 14, 1978

[54] TRANSMISSION-RATIO-CHANGER FOR MULTIPLE-TRANSMISSION-RATIO TRANSMISSION ARRANGEMENT

[75] Inventor: Heinrich Dick, Heidenheim, Brenz, Germany

[73] Assignee: Voith Getriebe KG, Heidenheim, Germany

[21] Appl. No.: 629,975

[22] Filed: Nov. 7, 1975

Related U.S. Application Data

[63] Continuation of Ser. No. 463,379, April 23, 1974, abandoned.

[30] Foreign Application Priority Data

Mar. 16, 1974 Germany .............................. 2412753
Apr. 26, 1973 Germany .............................. 2321090

[51] Int. Cl.$^2$ .................... B60K 41/10; F16H 5/64; F16H 5/61
[52] U.S. Cl. .................................... 74/866; 74/752 D
[58] Field of Search ................ 74/752 A, 752 D, 866, 74/365, 740, 745, 753, 751, 863, 864, DIG. 1

[56] References Cited

U.S. PATENT DOCUMENTS

| | | | |
|---|---|---|---|
| 3,640,152 | 2/1972 | Shirai et al. ..................... | 74/752 A |
| 3,724,293 | 4/1973 | Wakamatsu et al. ............... | 74/866 |
| 3,750,495 | 8/1973 | Ito et al. .......................... | 74/866 |
| 3,754,482 | 8/1973 | Sanders et al. .................... | 74/752 A |
| 3,823,621 | 7/1974 | Kubo et al. ........................ | 74/752 A |

Primary Examiner—Samuel Scott
Assistant Examiner—Lance W. Chandler
Attorney, Agent, or Firm—Michael J. Striker

[57] ABSTRACT

A multiple-transmission-ratio transmission arrangement includes at least first and second transmission-ratio-establishing units, for example brake bands and/or clutches, having hydraulically activated and unactivated states and operative in the hydraulically activated state for establishing respective first and second transmission ratios. An arrangement for changing the transmission ratio of the transmission arrangement comprises, in combination, a source of hydraulic activating fluid and conduits connected to the source and to the hydraulically activatable transmission-ratio-establishing units. Electrically controllable valves in the conduits are operative for alternately permitting and preventing the supply of hydraulic activating fluid to the transmission-ratio-establishing units. An electrical transmission-ratio-selecting arrangement is connected to the valves and is operative for charging the transmission ratio of the transmission arrangement by causing the valves to effect a change of state of one of the units and an opposite change of state of the other of the units. Included is an electronic timing arrangement operative during a change of transmission ratio for delaying the change of state of one of the units until after the change of state of the other of said units has been effected.

16 Claims, 4 Drawing Figures

TRANSMISSION-RATIO-CHANGER FOR MULTIPLE-TRANSMISSION-RATIO TRANSMISSION ARRANGEMENT

This is a continuation, of application Ser. No. 463 379, filed Apr. 23, 1974, now abandoned.

BACKGROUND OF THE INVENTION

The invention relates to a gear-changing apparatus of, for example, the type which connects the entire output shaft of an automobile engine to the drive axle of the automobile.

It is known (for example from the publication "Automobiltechnische Zeitschrift" 1971, pp. 161-169) to provide a gear-changing apparatus in which the arrangement which controls the operation of the gear-changing valves operates in a purely hydraulic manner. In other words, the information necessary to automatically initiate a gear change in the engine transmission is provided exclusively in the form of hydraulic pressure signals applied to the control arrangement which operates the gear-changing valves. This information relates to such engine operating variables as load (as indicated for example by the position of the gas pedal), vehicle speed (as indicated for example by the rotational speed of the transmission output shaft), and the like.

With the known arrangements, the actuation of the gear-changing valves which control the flow of fluid to the gear-changing units (such as the conventional brake bands or multiple-disk brakes and clutches) is likewise performed under the action of purely hydraulic control pressures.

When up-shifting (switching from a higher speed-reducing transmission gear ratio to a lower speed-reducing transmission gear ratio), it is desirable to avoid a transient discontinuity in the drive train. In other words, since up-shifting will generally result in a decrease of the engine output shaft rotational speed, it is important during up-shifting to prevent a transient removal of the load torque applied to the engine output shaft, since such transient removal of load torque would result in a transient engine output shaft speed increase—just the opposite of what is desired when up-shifting. To avoid such a transient discontinuity in the drive train, resort is had to a so-called "gear-shift overlap" expedient. For example, if in the lower gear a particular hydraulically actuated gear-changing member (such as a brake or clutch) is in engaged condition, and if in the next-higher gear such member is disengaged and a different gear-changing member (brake or clutch) is engaged, then the "gear-shift overlap" is caused to occur in the sense that the first such gear-changing member is not disengaged until after the second such gear-changing member has become engaged. The expression "gear-shift overlap" is appropriate because, for a brief period of time during the up-shifting operation, gear-changing members (brake bands or clutches) associated with two different tramsmission ratios are both engaged.

However, a difficulty is posed by such "gear-shift overlap" when the gear-changing members (such as brake bands) operate by the force of friction, because if two such brake bands, for example, are permitted to be engaged in this manner for a substantial period of time, then there may occur an excessive development of heat. In other words, care must be taken to assure that the time duration of the "gear-shift overlap" is optimally selected.

Such optimal selecting of the time duration of the "gear-shift overlap" can be effected in the known purely hydraulically operating transmission-controller only by means of hydraulically operating control elements. However, such hydraulically operating control elements exhibit disadvantages. Firstly, one is limited to the specific geometry and dimensions of the particular hydraulic control elements of the particular transmission-controlling hydraulic system, so that after the control system has been built and installed, subsequent changes in the duration of the "gear-shift overlap" can be made only with considerable difficulty, if at all. Secondly, the marked temperature-dependence of the viscosity of the hydraulic oil serving as the energy-transmitting medium for such hydraulic control elements can result in marked and unpredictable changes in the time duration of the "gear-shift overlap."

The same applies to down-shifting operations with such known gear-changing apparatuses (changing from a lower speed-reduction transmission ratio to a higher ratio). For down-shifting with the known apparatus, care is taken to assure that the previously engaged gear-shifting member (e.g., brake band or clutch) is disengaged at the same moment that the engagement of the gear-shifting member associated with the next transmission ratio is commanded. The practical significance of this is that, during such down-shifting operation, for a brief time neither of such two brake bands or clutches will be engaged, since there is always a time lag of a few tenths of a second between the generation of the command signal which commands engagement of such a gear-shifting member and completion of the movement of the member into fully engaged position. The resulting transient discontinuity in the power train (sometimes referred to as a "negative gear-shifting overlap") is in general desirable, since it results in transient removal of load torque from the engine output shaft and consequent quick increase of the engine output shaft rotational speed, such speed increase of the engine output shaft being what should occur in a down-shifting operation. However, when resort is had to this expedient, care must be taken that the time duration of the discontinuity in the power train be maintained at a certain preselected value, so as to minimize the jerk or jolt that results with this particular down-shifting method. Again, with the known hydraulically operating control arrangement for controlling the engine transmission ratio, it is difficult and expensive, when possible at all, to adjust the time duration of this power-train discontinuity, for example to meet new operating conditions. Likewise, as with respect to the time duration of the "gear-shifting overlap," it is extremely difficult if not impossible to prevent viscosity fluctuations in the hydraulic oil from having a marked effect upon the time duration of the power-train discontinuity.

SUMMARY OF THE INVENTION

It is accordingly a general object of the invention to provide a gear-shifting arrangement so designed that the time duration of the "gear-shifting overlap" and/or of the "power-train discontinuity" defined above can be readily and very precisely adjusted, even after construction and/or installation of the transmission arrangement in an automobile, for example.

This object, and others which will become more understandable from the description further below of specific embodiments, can be met, according to one advantageous concept of the invention, by providing, in a multiple-transmission-ratio transmission arrangement of the type including at least first and second transmission-ratio-establishing units, such as brake bands and/or clutches, having hydraulically activated and unactivated states and operative in the hydraulically activated state for establishing respective first and second transmission ratios, an arrangement for changing the transmission ratio of the transmission arrangement, comprising, in combination, a source of hydraulic activating fluid, conduits connected to the source and to the hydraulically activatable transmission-ratio-establishing units (brakes and/or clutches), and electrically controllable valve means in such conduits for alternately permitting and preventing supply of hydraulic activating fluid to the transmission-ratio-establishing units (brakes and/or clutches). According to the invention, the arrangement further includes electrical transmission-ratio-selecting means connected to said valve means and operative for changing the transmission ratio of the transmission arrangement by causing the valve means to effect a change of state of one of said units and an opposite change of state of the other of said units. The electrical transmission-ratio-selecting means includes electronic timing means operative during a change of transmission ratio for delaying the change of state of one of said units until after the change of state of the other of said units has been effected.

The advantage of employing an electronic timing means in the context explained above is the precision and ease with which adjustments can be made in the above-defined "gear-shifting overlap" and/or in the above-defined "power-train discontinuity."

According to a further advantageous concept of the invention, when the multiple-transmission-ratio transmission arrangement is used for interconnecting the engine and wheels of an automobile, for example, the time duration of the above-defined "gear-shifting overlap" and/or of the above-defined "power-train discontinuity" can be varied in automatic dependence upon one or more engine operating variables and/or vehicle parameters, such as engine loading (represented for example by gas-pedal position), engine or vehicle-wheel speed (as detected by tachometers, for example). For example, the time duration of the above-defined "gear-shifting overlap" for up-shifting can be greater at full load (e.g., fully depressed gas pedal) than at partial load (e.g., halfdepressed gas pedal), so as to prevent engine racing.

In the event that the time duration of only the up-shifting "gear-shifting overlap" or else of only the down-shifting "power-train discontinuity" is to be controlled in dependence upon engine operation, e.g., in dependence upon engine loading, then it is advantageous to make use of an expedient disclosed more fully below, according to which the electronic timing means is comprised of an RC-circuit, with one of the resistors of the RC-circuit being shunted or not shunted by an additional resistor, in dependence upon engine load, so as to change the time constant of the RC-circuit in dependence upon engine load. The advantage of this expedient is that, under conditions of full load, the charge time of the timing capacitor of the RC-circuit (and accordingly the duration of the up-shift "gear-shifting overlap" or the down-shift "power-train discontinuity") can be made longer than under conditions of partial load.

If the duration of the up-shift "gear-shifting overlap" or of the down-shift "power-train discontinuity" is made dependent upon the rotational speed of the output shaft of the transmission arrangement, it becomes possible to compensate for the effect of rotational speed upon the shifting characteristics of a clutch of the transmission arrangement; for with such an hydraulically activatable clutch the effective pressure of the hydraulic activating fluid sometimes increases in response to an increase of speed and thus shortens the time required for the clutch to actually become engaged. From that jerks may result. The novel features which are considered as characteristic for the invention are set forth in particular in the appended claims. The invention itself, however, both as to its construction and its method of operation, together with additional objects and advantages thereof, will be best understood from the following description of specific embodiments when read in connection with accompanying drawing.

DESCRIPTION OF THE PREFERRED EMBODIMENTS

Figure 1:
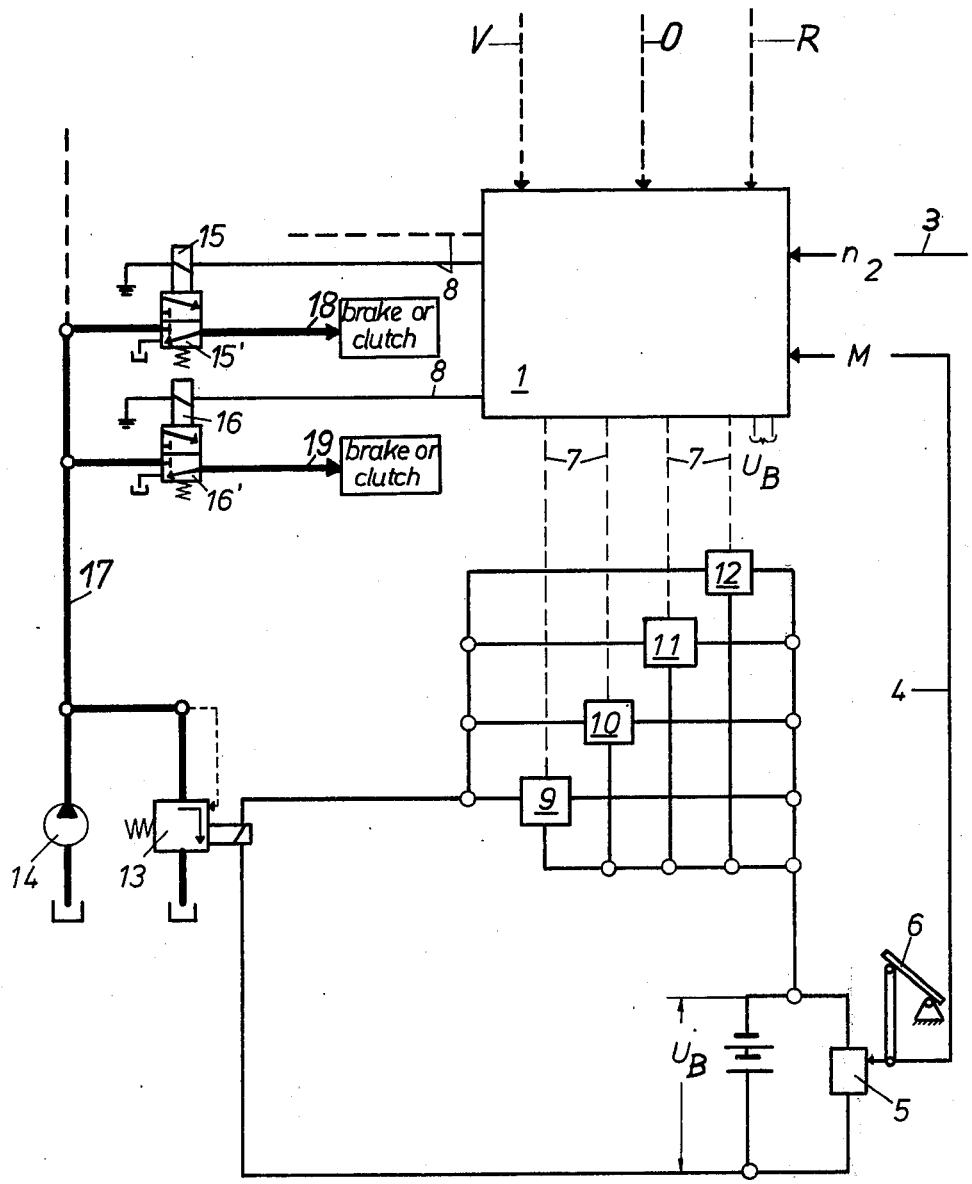
FIG. 1 is a schematic diagram of a control arrangement for controlling the transmission ratio of a multiple-transmission ratio transmission arrangement.

In FIG. 1, reference numeral 1 designates in toto the electrical and electronic circuitry which controls the automatic change of transmission ratio in a multiple-transmission-ratio automobile transmission arrangement. The circuit 1 has inputs V, O and R, for receipt of "forwards," "neutral" and "reverse" command signals, respectively. The circuit 1 has an input 3 for receipt of an RPM signal $n_2$ indicative of vehicle-wheel speed or transmission output shaft speed. The circuit 1 has a further input 4 for receipt of an engine-loading signal M, which in the schematic illustration of FIG. 1 is depicted as being derived from a potentiometer 5 connected across a voltage source $U_B$ and having a wiper linked to the gas pedal 6. The manner in which the circuit 1 processes the signals V, O, R, $n_2$ and M (plus any other input signals) and in dependence thereon automatically selects the appropriate transmission ratio is elementary in the automatic-transmission art, and will not be explained herein.

The arrangement depicted in FIG. 1 includes a pump 14 constituting a source of hydraulic activating fluid. Connected to the outlet of pump 14 is a pressure-limiting valve 13 normally operative for limiting the pressure of fluid supplied by the pump, and additionally operative when the solenoid thereof is energized for decreasing the hydraulic pressure in the system. A conduit 17 leads from the outlet of pump 14 and branches off into two further conduits 18 and 19 which lead to transmission-ratio-establishing units of the multiple-transmission-ratio transmission arrangement. In the illustrated embodiment each of these two transmission-ratio-establishing units is an hydraulically activatable brake band or clutch. Each of the two conduits 18, 19 leads to one of the two hydraulically activatable transmission-ratio-selecting units (brake band or multiple-disk brake or clutch). For purposes of explanation, it is assumed that in the transmission arrangement in question, to change from one transmission ratio to another, one of the hydraulically activatable transmission-ratio-establishing units is activated and another of the transmission-ratio-establishing units is deactivated. Activation and deactivation of the hydraulically activatable transmission-ratio-establishing units is effected by opening and closing the respective control valves which supply hydraulic activating fluid. For purposes of explanation, it is assumed that each transmission-ratio-establishing unit is provided with one such control valve. For the sake of simplicity, in FIG. 1 only two such control valves 15', 16' are depicted, operative for controlling flow of fluid to the hydraulically activatable brake bands and/or clutches supplied via conduits 18, 19. It will be understood that usually a greater number of such brake bands and/or clutches, or the equivalent, are provided, for more than two transmission ratios.

It is further assumed that when only the transmission-ratio-establishing unit supplied through valve 15' is activated, the transmission arrangement is in second gear. Similarly, it is assumed that when only the transmission-ratio-establishing unit supplied through valve 16' is activated, the transmission arrangement is in third gear.

The central control circuit 1 has one set of outputs 7 and another set of outputs 8 of which latter only two are depicted. When the central control circuit 1 automatically initiates a transmission-ratio change, a respective one of the four monostable multivibrators 9, 10, 11, 12 is triggered, and the output pulse of the multivibrator is applied to the solenoid of valve 13, opening the valve to effect a transient pressure drop during the transmission-ratio change, so that the activation of the respective one of the brake bands and/or clutches will not be excessively violent. The outputs 8, on the other hand, energize the solenoids 15, 16 of valves 15', 16', in order to initiate the transmission-ratio change and in order to maintain the new transmission ratio.

As explained further above, during up-shifting, e.g., changing from first gear to second gear or changing from second gear to third gear, there is deliberately provided an overlap in the activation of the two transmission-ratio-establishing units involved in the transmission-ratio change. As also explained above, during down-shifting, e.g., changing from third gear to second gear or changing from second gear to first gear, there is deliberately provided a transient interruption in the continuity of the power train, with both of the transmission-ratio-establishing units involved in the transmission-ratio change being for a brief time in unactivated state.

Figure 2:
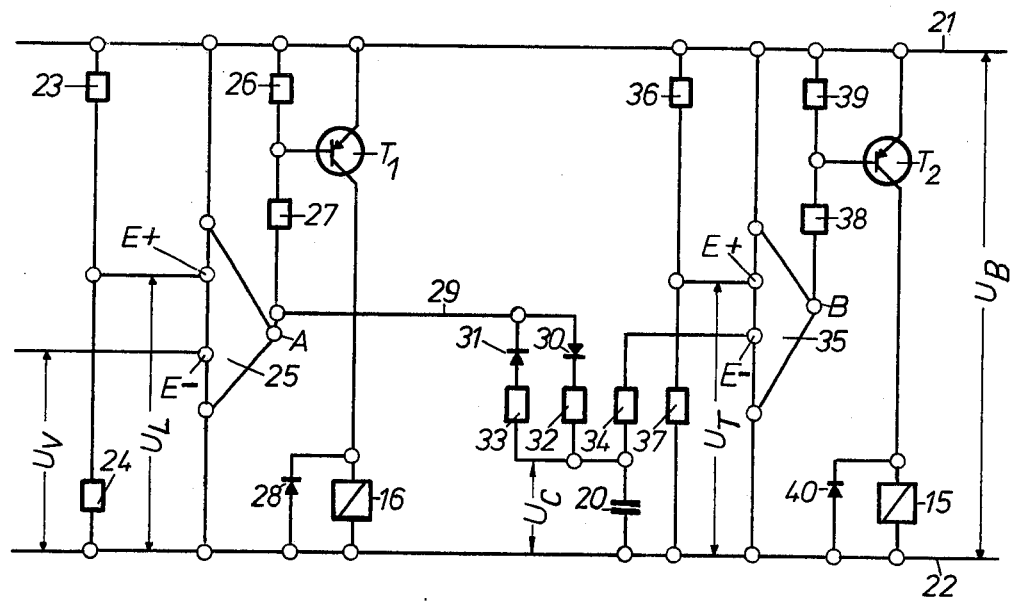
FIG. 2 is a circuit diagram of the inventive portion of the circuit block 1 of FIG. 1.
Figure 3:
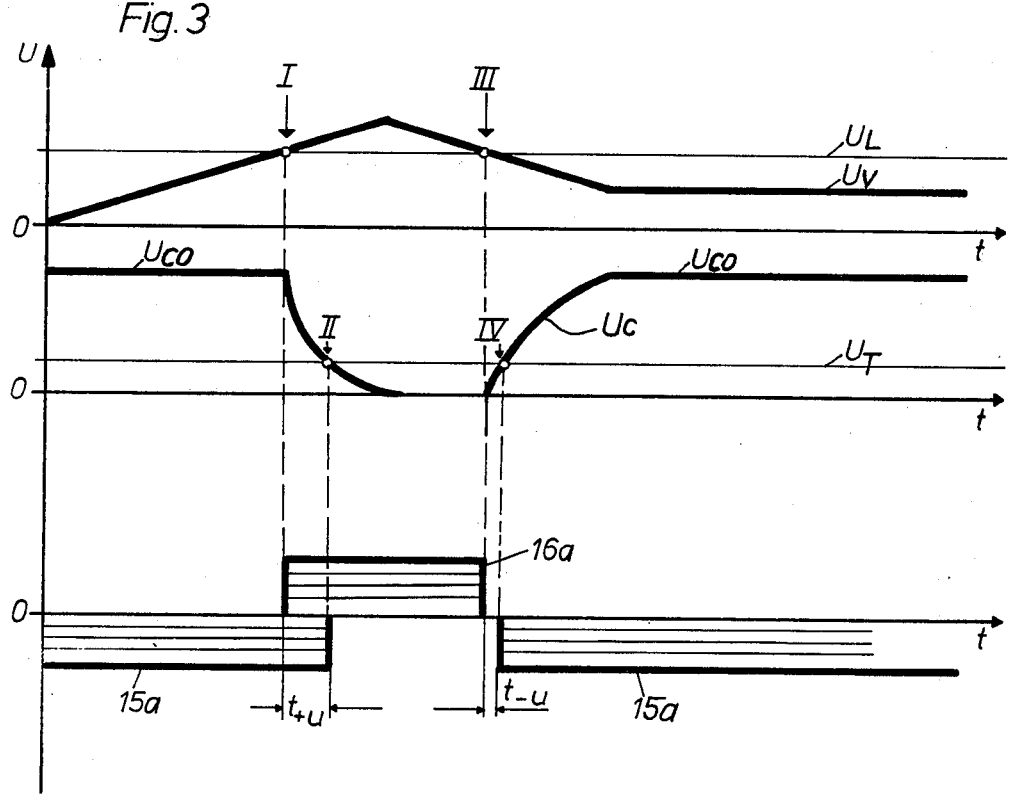
FIG. 3 is a graph depicting certain aspects of the operation of the disclosed arrangement.

FIG. 2 depicts the inventive portion of the central control circuit 1 shown only schematically in FIG. 1, namely the portion which causes the up-shift and down-shift between second and third gear to be performed in the desired manner. FIG. 3 depicts in graphical form the operation of the circuit of FIG. 2.

The circuit of FIG. 2 is comprised of two bias-voltage supply lines 21, 22 respectively connected to the positive and negative terminals of the D.C. voltage source $U_B$. Connected across the bias-voltage lines 21, 22 is a voltage divider comprised of resistors 23, 24. The voltage drop across resistor 24 is designated $U_L$ and is applied to the input E+ of a comparator amplifier 25 (e.g., a Schmitt trigger). Connected between the output A of amplifier 25 and the positive line 21 is a voltage divider 26, 27, the tap of which is connected to the base of a pnp-transistor T1. The emitter-collector path of transistor T1 is connected in series with the valve solenoid 16 of the 3rd-gear valve 16', this solenoid 16 being shunted by a diode 28. Applied to the input E— of comparator 25 is a voltage $U_V$ which is generated by a (non-illustrated) circuit in circuit block 1 (FIG. 1) as a function of the speed signal $n_2$ and the motor-loading signal M. The manner in which the speed signal $n_2$ and M are functionally interrelated to produce the gear-shifting voltage $U_V$ is conventional per se and does not form part of the invention.

Connected to the output A of amplifier 25 is a conductor 29 which splits off into parallel circuit branches 31, 33 and 30, 32, each circuit branch comprised of the series connection of a resistor and a diode, but with the diodes of the two parallel branches being arranged with opposite polarity. Connected between the junction of resistors 33, 32 on the one hand and the negative voltage line 22 on the other hand is a timing capacitor 20. A resistor is connected between the output of the RC-delay stage 20, 30–33 and the input E— of a comparator 35. A voltage divider 36, 37 is connected across the bias voltage lines 21, 22, and the voltage divider tap is connected to the input E+ of comparator 35, to apply to that input a reference voltage $U_T$. A voltage divider 38, 39 is connected between the output B of comparator 35 and the positive voltage line 21. The tap of voltage divider 38, 39 is connected to the base of a pnp switching transistor T2, the emitter-collector path of which is connected in series with the solenoid 15 of 2nd-gear valve 15', a diode 40 shunting the solenoid 15.

FIG. 3 depicts in graphical form the operation of the circuit of FIG. 2. The graphs in FIG. 3 are all plotted with time t along the horizontal axis. Depicted are the speed-dependent gear-shifting voltage $U_V$, the reference voltage $U_L$, the control voltage $U_C$ across timing capacitor 20, the reference voltage $U_T$; also, the line 15a designates the open condition of valve 15', and the line 16a designates the open condition of valve 16'.

As long as $U_L$ is larger than $U_V$, the voltage at output A of comparator 25 is too high to permit conduction by transistor T1, so that transistor T1 is non-conductive and valve solenoid 16 is unenergized. Furthermore, the voltage $U_C$ across timing capacitor 20 will have assumed approximately the voltage at the output A of comparator 25, and this voltage is greater than the reference voltage $U_T$. Accordingly, the voltage at output B of comparator 35 is low enough to forward-bias transistor T2, so that transistor T2 is conductive and the valve solenoid 15 is energized. Consequently, the valve 15' is open, whereas the valve 16' is closed, and the associated transmission-ratio-establishing units are respectively hydraulically activated and unactivated, so that the transmission arrangement is in 2nd gear.

Now, the gear-shifting voltage $U_V$ rises, for example as a result of increasing transmission output RPM, until the voltage $U_V$ reaches the reference value $U_L$ (point I), and then exceeds the value $U_L$. As a result, transistor T1 becomes conductive, thereby energizing valve solenoid 16. As a result, valve 16 opens, and the associated transmission-ratio-establishing unit (brake band or clutch) is activated; it is to be recalled that the hydraulically activated unit controlled by valve 16' is associated with 3-gear.

Because the voltage $U_V$ is now greater than the voltage $U_L$, the voltage at comparator output A is low, and the capacitor 20 discharges exponentially through the discharge path 33, 31, 29. When the capacitor voltage $U_C$ falls below the reference voltage $U_T$ (point II), transistor T2 becomes non-conductive, thereby deenergizing the valve solenoid 15. The time interval between the time points I and II is designated $t_{+u}$ in FIG. 3 and has a value determined by the equation $$t_{+u} = R_{33}C_{20} \cdot \ln[U_{C_0}/U_T]$$

where $R_{33}$ is the resistance in ohms of resistor 33, $C_{20}$ is the capacitance of capacitor 20, and $U_{C_0}$ is the voltage value of the capacitor voltage $U_C$ prior to the point I, as depicted in FIG. 3.

If the gear-shifting voltage $U_V$ now decreases, for example as a result of decreasing transmission output RPM, and if the voltage $U_V$ falls below the reference voltage $U_L$, the transistor T1 becomes non-conductive, thereby deenergizing valve solenoid 16. Simultaneously, the timing capacitor 20 begins to charge via the charging path 20, 30, 32. The capacitor voltage $U_C$ rises exponentially (as shown in FIG. 3) until at point IV the voltage $U_C$ exceeds the reference voltage $U_T$, thereby rendering transistor T2 conductive and energizing valve solenoid 15. The time interval $t_{-u}$, constituting the time duration of the down-shift "power-train discontinuity" has a value determined by the equation $$t_{-u} = R_{32}C_{20} \cdot \ln[U_{C_0}/(U_{C_0} - U_T)]$$

wherein $R_{32}$ is the ohmic resistance of resistor 32, $C_{20}$ is the capacitance of capacitor 20, and $U_{C_0}$ is the value of the capacitor voltage $U_C$ prior to the point I.

The capacitance C of capacitor 20 is the same for both the "gear-shifting overlap" (the time period $t_{+u}$ during which 2nd-gear valve 15' and 3rd-gear valve 16' are both open) and the "power-train discontinuity" (the time period $t_{-u}$ during which the 2nd-gear valve 15' and the 3rd-gear valve 16' are both closed). Also, the maximum value $U_{C_0}$ of the voltage $U_C$ across capacitor 20 and the reference voltage $U_T$ do not change. Accordingly, the time intervals $t_{+u}$ and $t_{-u}$ are established exclusively by the values of the resistors 33 and 32, respectively. To change one or both of the time intervals $t_{+u}$ and $t_{-u}$, it is merely necessary to select for resistors 33 and 32 the corresponding resistance values, to meet the requirements of a particular application; to this end, the resistors 33, 32 are advantageously variable resistors.

Figure 4:
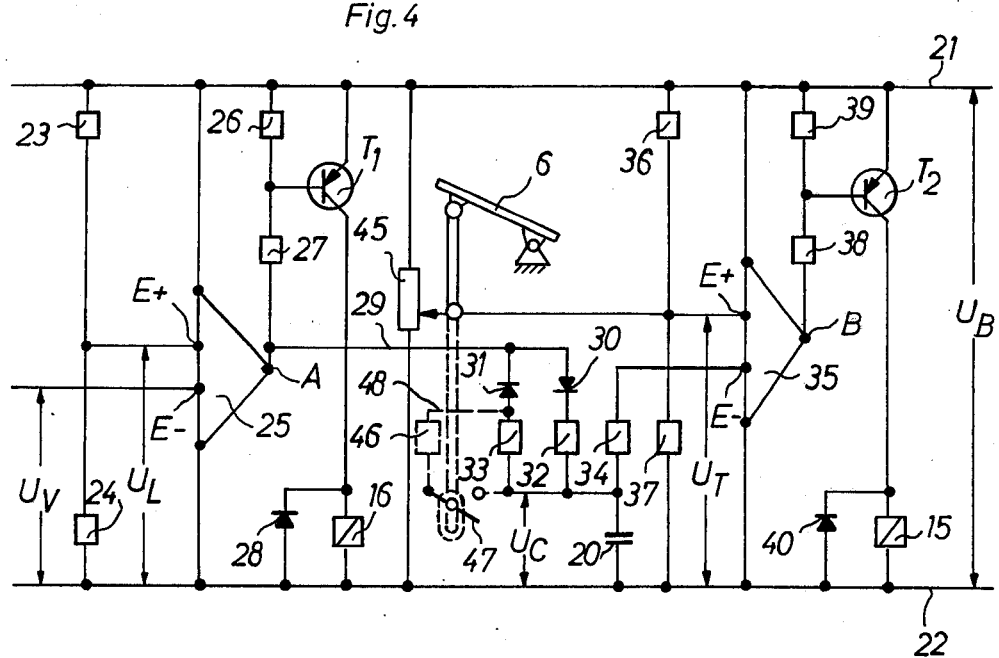
FIG. 4 depicts a modification of the circuit of FIG. 2.

The circuit depicted in FIG. 4 differs from that of FIG. 2 by the presence of additional components operative for effecting automatic changes in the durations of time intervals $t_{+u}$ and/or $t_{-u}$ in dependence upon the loading of the engine which cooperates with the transmission arrangement. To this end, there is provided a potentiometer 45, the wiper of which is electrically connected to the input E+ of the comparator 35 (e.g., Schmitt trigger) and mechanically coupled to the engine gas pedal 6. The greater the depression of gas pedal 6—i.e., the greater the loading of the engine—, the smaller is the reference voltage $U_T$. With reference to the graph shown in FIG. 3, this results in a shifting to the right of the point II, and accordingly in an increase of the time duration of the up-shift "gear-shifting overlap" $t_{+u}$. The change, if any, in the "power-train discontinuity" or "negative gear-shifting overlap" $t_{-u}$ is negligibly small.

Another method of automatically varying the up-shift "gear-shifting overlap" $t_{+u}$ is automatic dependence upon engine operation, and without affecting the down-shift "negative gear-shifting overlap" $t_{-u}$, is indicated in FIG. 4 in broken lines. A shunting resistor 46 has one terminal connected to one terminal of discharge resistor 33 via a conductor 48. The other terminal of shunting resistor 46 becomes connected to the other terminal of discharge resistor 33 when gas-pedal-controlled switch 47 closes. When the gas pedal is depressed to an extent corresponding to full loading of the engine, the switch 47 opens; otherwise, the switch 47 is closed. Accordingly, in the case of full loading of the engine (gas pedal depressed beyond a predetermined extent), the discharge time of capacitor 20 and accordingly the up-shift "gear-shifting overlap" $t_{+u}$ will be longer than at partial engine loading.

It will be understood that each of the elements described above, or two or more together, may also find a useful application in other types of circuits and constructions differing from the types described above.

While the invention has been illustrated and described as embodied in a multiple-transmission-ratio transmission arrangement used for interconnecting the engine and wheels of an automotive vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended:

1. In a multiple-transmission-ratio transmission arrangement of the type including at least first and second transmission-ratio-establishing units, particularly brakes and/or clutches, having hydraulically activated and unactivated states said first and second transmission-ratio-establishing units together establishing a first transmission ratio when concurrently said first unit is in a predetermined one of its hydraulic activation states and said second unit is in a predetermined one of its hydraulic activation states, said first and second transmission-ratio-establishing units together establishing a second transmission ratio when concurrently said first unit is in the other of its hydraulic activation states and said second unit is in the other of its hydraulic activation states, an arrangement for changing the transmission ratio of the transmission arrangement, comprising, in combination, a source of hydraulic activating fluid; conduits connected to said source and to said hydraulically activatable transmission-ratio-establishing units; first and second electrically controllable valve means in said conduits for alternately permitting and preventing supply of hydraulic activating fluid to said units, said first and second electrically controllable valve means each having a first electrical energization state and a second electrical energization state, said first electrically controllable valve means being operative when in one of its electrical energization states for causing said first transmission-ratio-establishing unit to assume one of its hydraulic activation states and being operative when in the other of its electrical energization states for causing said first transmission-ratio-establishing unit to assume the other of its hydraulic activation states, said second electrically controllable valve means being operative when in one of its electrical energization states for causing said second transmission-ratio-establishing unit to assume one of its hydraulic activation states and being operative when in the other of its electrical energization states for causing said second transmission-ratio-establishing unit to assume the other of its hydraulic activation states; and electrical transmission-ratio-selecting means connected to said valve means and operative for changing the transmission ratio of the transmission arrangement by effecting a change of electrical energization state of one of said valve means and a change of electrical energization state of the other of said valve means to accordingly cause a change of state of one of said units and a change of state of the other of said units, and including electronic timing means operative during a change of transmission ratio for delaying the initiation of the change of electrical energization state of one of said valve means until after elapse of a predetermined time interval following initiation of the change of electrical energization state of the other of said valve means, to correspondingly delay the initiation of the change of state of one of said units until after the initiation of the change of state of the other of said units has been effected.

2. In a transmission arrangement as defined in claim 1, wherein said electrical transmission-ratio-selecting means comprises means operative for changing the transmission ratio of said transmission arrangement from said first ratio of said second ratio by causing said valve means to activate said second unit and deactivate said first unit, and wherein said electronic timing means comprises means operative during such change from said first ratio to said second ratio for delaying the initiation of the requisite change of state of said first valve means until after the elapse of a predetermined time interval following the initiation of the requisite change of state of said second valve means.

3. In a transmission arrangement as defined in claim 1, wherein said electrical transmission-ratio-selecting means comprises means operative for changing the transmission ratio of said transmission arrangement from said second ratio to said first ratio by causing said valve means to activate said first unit and deactivate said second unit, and wherein said electronic timing comprises means operative during such change from said second ratio to said first ratio for delaying the initiation of the requisite change of state of said first valve means until after elapse of a predetermined time interval following the initiation of the requisite change of state of said second valve means.

4. In a transmission arrangement as defined in claim 1, wherein said electrical transmission-ratio-selecting means comprises means operative for changing the transmission ratio of said transmission arrangement from said first to said second ratio and from said second to said first ratio by causing said valve means to activate one of said units, and wherein said electronic timing means comprises means operative during the change from said first to said second ratio for delaying the initiation of the requisite change of state of said first valve means until after elapse of a predetermined time interval following the initiation of the requisite change of state of said second valve means, and operative during a change from said second to said first ratio for delaying the initiation of the requisite change of state of said first valve means until after elapse of a predetermined time interval following the initiation of the requisite change of state of said second valve means.

5. In a transmission arrangement as defined in claim 2, wherein said first transmission ratio is higher than said second transmission ratio.

6. In a transmission arrangement as defined in claim 3, wherein said first transmission ratio is higher than said second transmission ratio.

7. In a transmission arrangement as defined in claim 4, wherein said first transmission ratio is higher than said second transmission ratio.

8. In a transmission arrangement as defined in claim 1, wherein said electronic timing means comprises an adjustable RC-circuit comprised of an electrical component adjustable for varying the duration of said predetermined time interval.

9. In a transmission arrangement as defined in claim 1, wherein said first and second valve means comprise a first and a second electrically controllable valve respectively comprised of a first and a second valve solenoid and operative for alternately permitting and preventing supply of hydraulic activating fluid to said first and said second unit, respectively, wherein said electrical transmission-ratio-selecting means comprises a first circuit having an output connected to said first solenoid and having an input and operative for controlling the energization of said first solenoid in dependence upon the voltage applied to the input thereof, a second circuit having an output connected to said second solenoid and having an input and operative for controlling the energization of said second solenoid in dependence upon the voltage applied to the input thereof, and wherein said electronic timing means comprises an RC-time-delay circuit stage having an input connected to the output of said second circuit and an output connected to the input of said first circuit and comprised of a time-delay capacitor connected in series with the parallel combination of two circuit branches, the two conduit branches each being comprised of the series connection of a resistor and a diode, and the diodes of the two circuit branches being of opposite polarity.

10. In a transmission arrangement as defined in claim 9, wherein said second circuit comprises a comparator having an output, an electronic switch in series with said second solenoid and having a control input connected to said output of said comparator, said comparator having an inverting input connected to said output of said RC-time-delay circuit state and having a non-inverting input, and means for applying a reference voltage to said non-inverting input.

11. In a transmission arrangement as defined in claim 10, the transmission arrangement being the transmission arrangement of an internal combustion engine of an automotive vehicle, and wherein said means for applying a reference voltage to said non-inverting input comprises means for varying said reference voltage in dependence upon the loading of the internal combustion engine.

12. In a transmission arrangement as defined in claim 10, the transmission having a rotating output member, and wherein said means for applying a reference voltage to said non-inverting input comprises means for varying said reference voltage in dependence upon the rotational speed of the rotating output member.

13. In a transmission arrangement as defined in claim 9, the transmission arrangement being the transmission arrangement of an internal combustion engine of an automotive vehicle, and wherein said electronic timing means further includes an additional resistor, and switch means for connecting said additional capacitor in parallel with one of said resistors of said two circuit branches in dependence upon the operation of the internal combustion engine.

14. In a transmission arrangement as defined in claim 2, the transmission arrangement being the transmission arrangement of an internal combustion engine, and wherein said electronic timing means includes means for varying said predetermined time interval in dependence upon the operation of the engine.

15. In a transmission arrangement as defined in claim 3, the transmission arrangement being the transmission arrangement of an internal combustion engine, and wherein said electronic timing means includes means for varying said predetermined time interval in dependence upon the operation of the engine.

16. In a transmission arrangement as defined in claim 4, the transmission arrangement being the transmission arrangement of an internal combustion engine, and wherein said electronic timing means includes means for varying the duration of at least one of said predetermined time intervals in dependence upon the operation of the engine.

* * * * *